United States Patent [19]

Powers et al.

[11] Patent Number: 4,577,796
[45] Date of Patent: Mar. 25, 1986

[54] METHOD AND APPARATUS FOR TRACKING SEAM WELDS ON PIPES AND THE LIKE

[75] Inventors: Joseph E. Powers; Calvin C. Williamson, both of Napa, Calif.

[73] Assignee: Kaiser Steel Corporation, Fontana, Calif.

[21] Appl. No.: 658,992

[22] Filed: Oct. 10, 1984

[51] Int. Cl.⁴ .................. B23K 37/02; B23K 5/02; B23K 11/30

[52] U.S. Cl. .................. 228/102; 228/105; 228/7; 228/8

[58] Field of Search ............. 228/7, 8, 9, 15.1, 17, 228/17.5, 102, 103, 104, 105; 358/101, 106; 219/124.34, 130.01

[56] References Cited

U.S. PATENT DOCUMENTS

| | | | |
|---|---|---|---|
| 2,303,473 | 12/1942 | Jones | 228/7 |
| 3,150,624 | 9/1964 | Brems | 228/7 |
| 3,158,121 | 11/1964 | Brems | 228/7 |
| 3,443,732 | 5/1969 | Wall, Jr. et al. | 228/7 |
| 3,449,540 | 6/1969 | Yanko et al. | 228/7 |
| 3,857,162 | 12/1974 | Hoffmann et al. | 228/102 |
| 4,014,495 | 3/1977 | Oda et al. | 228/7 |
| 4,021,840 | 5/1977 | Ellsworth et al. | 358/101 |
| 4,285,460 | 8/1981 | Clavin | 228/7 |
| 4,288,020 | 9/1981 | Searles et al. | 228/7 |
| 4,319,269 | 3/1982 | Kajiura et al. | 358/106 |

FOREIGN PATENT DOCUMENTS 806325 2/1981 U.S.S.R. .................. 228/7

Primary Examiner—Nicholas P. Godici
Assistant Examiner—M. Jordan
Attorney, Agent, or Firm—Burns, Doane, Swecker and Mathis

[57] ABSTRACT

Apparatus and method for accurately aligning and applying the outside longitudinal weld seam, with the weld seam of a section of large diameter thick gauge steel pipe generally after the inside weld has already been made, including support means for maintaining the pipe section in a stationary position, a plurality of adjustable scanning and tracking assemblies mounted at spaced measured stations along the length of the apparatus, each of which include optical scanning means whereby the scanning and tracking assemblies can be centered with respect to the seam weld of the pipe section at the point of scan, guide means connected to each scanning assembly so that the movement thereof causes said guide means to assume a contour corresponding to the longitudinal weld seam, and a welding machine which follows the path of said guide means to thereby apply the outside weld seam in alignment with the weld seam as the pipe is held stationary and the welding machine travels along the length thereof.

9 Claims, 7 Drawing Figures

METHOD AND APPARATUS FOR TRACKING SEAM WELDS ON PIPES AND THE LIKE

This invention relates to tracking the weld seam of a welded pipe section, and more particularly it relates to a method and apparatus assuring that the welding head of a submerged arc welder accurately tracks and deposits outside weld metal on the center line of the inside longitudinal weld seam of large diameter pipe sections manufactured by the U-O method and the like.

BACKGROUND OF THE INVENTION

In the manufacture of steel pipe from sheet and plate according to the U-O method and the like wherein the cylindrical shaped sections after leaving the O-Press with the edges in an abutting relation to each other, it is necessary to join the pipe by a longitudinal seam weld. The welding operation is one of the most critical in the pipe making process therefore it is necessary to obtain sound and properly positioned welds. One of the problems encountered in welding the abutting edges of the O-shaped pipe is the inability to obtain pipe lengths wherein the edges of the sections to be welded are straight and entirely even. The longitudinal edges of a metal sheet or plate are sheared or milled to a width exactly suitable for the diameter of a cylindrical section to be formed in an O-Press or other forming means. After the sheet or plate is formed into a cylindrical shape, the abutting edges which form the weld seam may not be straight relative to the axis of the pipe. These edges may be curved, S-shaped or slightly spiral relative to the longitudinal axis of the pipe. Also, the formed cylinder may be bowed throughout its length thus causing additional misalignment of the weld seam with the theoretical longitudinal axis of the pipe. These conditions are often caused when physical stresses are changed or relieved during shearing and milling of the edges and in cold working of the plate during the forming process from the flat section to a cylindrical shape. In the typical longitudinal seam welding operation the formed pipe is first tack-welded at predetermined intervals or continuously along the full length of the pipe seam to hold the edges in close relationship while the finished inside weld is carried out. This may be done by an automatic tack-welding machine or may be done manually. In any event, the shaped pipe is clamped in the closed position so that the edges of the section are abutting when the tack-welding operation is carried out.

The pipe is then conveyed to the inside welders wherein a long boom or other traveling welding apparatus may be acurately positioned so that the welding head moves along the inside seam while depositing a weld which is designed to penetrate about 60% of the thickness of the plate or sheet as the case may be. The welding head is guided by a V-shaped wheel riding in a groove formed by the edges which must be bevelled to provide a weld groove during the edge forming operation for the pipe section. It is important that the weld penetrate to a sufficient depth within the plate to assure interlocking of the inside and outside welds and at least to an extent equal to about twenty percent (20%) of the interlocked weld.

In many operations the tack-welding is conducted according to the metallic inert gas welding process, that is, MIG process, and in most inside and outside seam welding operations, the conventional automatic submerged arc welding process is utilized. This particular invention as described hereinbelow is concerned with the proper alignment of the outside weld with the inside weld so that the critical interlocking of the weld nuggets is achieved.

SUMMARY OF THE INVENTION

The present invention relates to a method and apparatus for obtaining proper alignment between the outside weld and the inside weld on a steel pipe, particularly large diameter pipe, by utilizing a plurality of adjustable scanning devices at spaced points along the length of a pipe section. The scanning devices are positioned immediately above the abutting edges of the weld seam. The assembly on which the scanning devices are mounted comprise a flexible steel beam which can be adjusted to assume a contour along its length corresponding to that of the weld seam. The so contoured flexible steel beam, or at least one of its sides, serves as the track or guide face which defines the path for a traveling submerged arc AC welding wire feeder head or the like, which travels along the length of the pipe in the precise path defined by the guide beam and which path corresponds to the weld seam of the pipe. Accurate positioning and springing of the beam to guide the welding equipment along the welding path are essential to obtain the critical interlocking of the outer weld to the inner weld along the length of the pipe section.

It is essential in the welding of thick gauge pipe to have the inner and outer cone-shaped weld seams or nuggets in accurate alignment, that is, for optimum results, the root or peak of the inner weld and the root of the outer weld should not vary more than 1/32th of an inch on either side. Accordingly, the problem of accurately aligning the outside weld with the inside weld nuggets occurs when the outside weld is applied to the abutting edges after the inside weld is in place.

In the seam welding methods which are conventionally used each weld penetrates approximately two-thirds (⅔) the thickness of the pipe or seam. Accordingly, when a pipe section about 40 feet or more in length is received after the inside weld is complete, the weld seam at the abutment in many instances will not be in a straight line because of the inaccuracy in the edges of the plate from which it is made, or because the plate may be bowed or have been subject to processes which may result in curved, spiral or an S-shaped seam.

In the operation of the proposed seam tracking system, an adjustable optical scanning system is employed which includes TV cameras positioned at selected points along the pipe length above the weld seam. The scanning system adjusts the contour of a spring steel girder located at a fixed distance from the camera at corresponding points along the pipe length to reflect the longitudinal variation of the weld seam, that is, the system provides a path that is fixed by bending a bar to a shape that conforms to the configuration of the seam. Thereafter, the outside weld is completed by a welding cart that travels in the path of the seam that has been tracked on the flexible beam.

A more complete understanding of the invention can be had by reference to the accompanying drawings which are described below.

DRAWINGS

DESCRIPTION OF THE INVENTION

Figure 1:
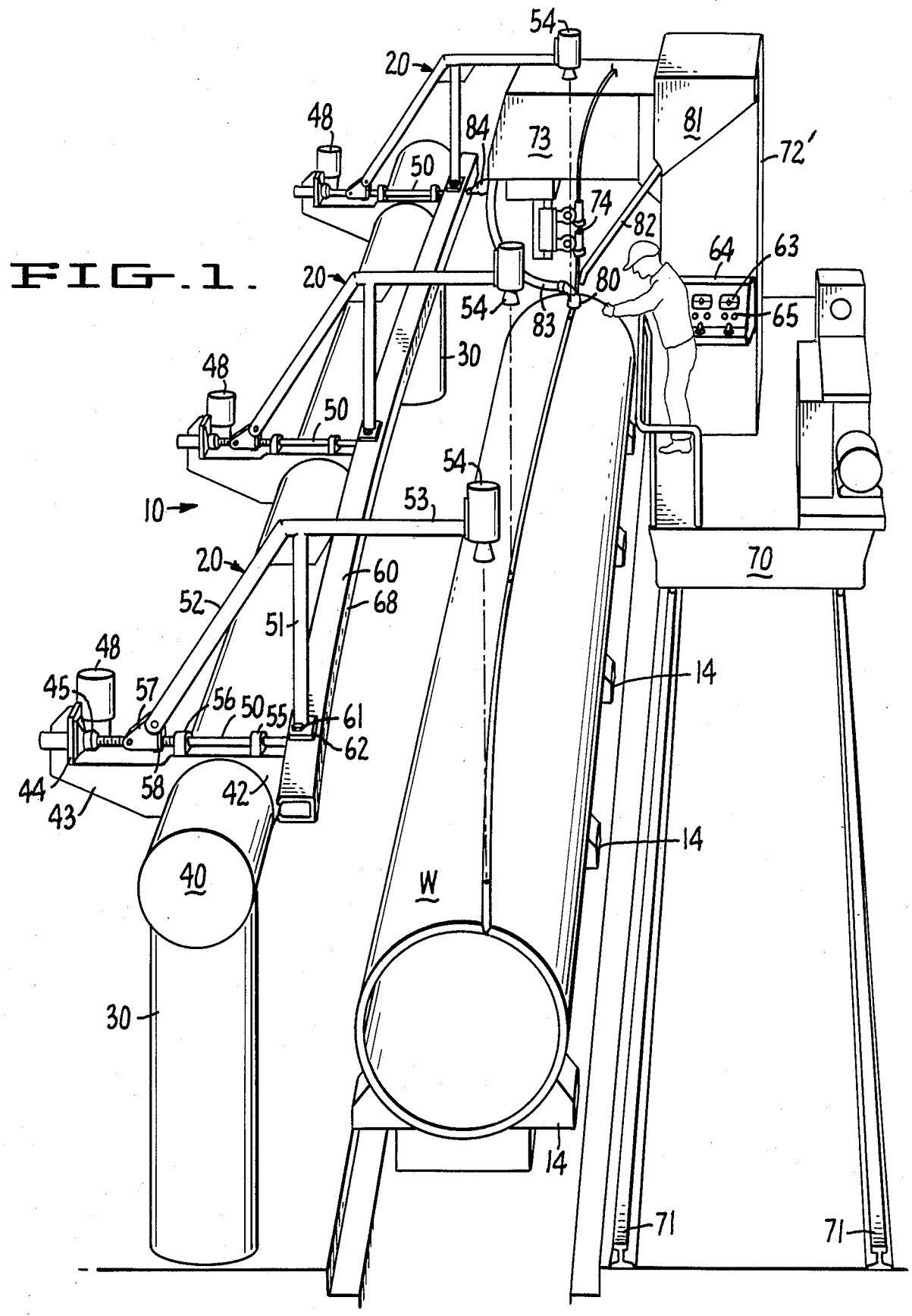
FIG. 1 is a perspective view of the welding machine showing the pipe to be welded, the welding equipment mounted on a traveling platform with the operator's console mounted on it, and the horizontally adjustable scanning assembly with the overhead T.V. cameras attached to it for properly aligning the beam with the outside weld seam.
Figure 2:
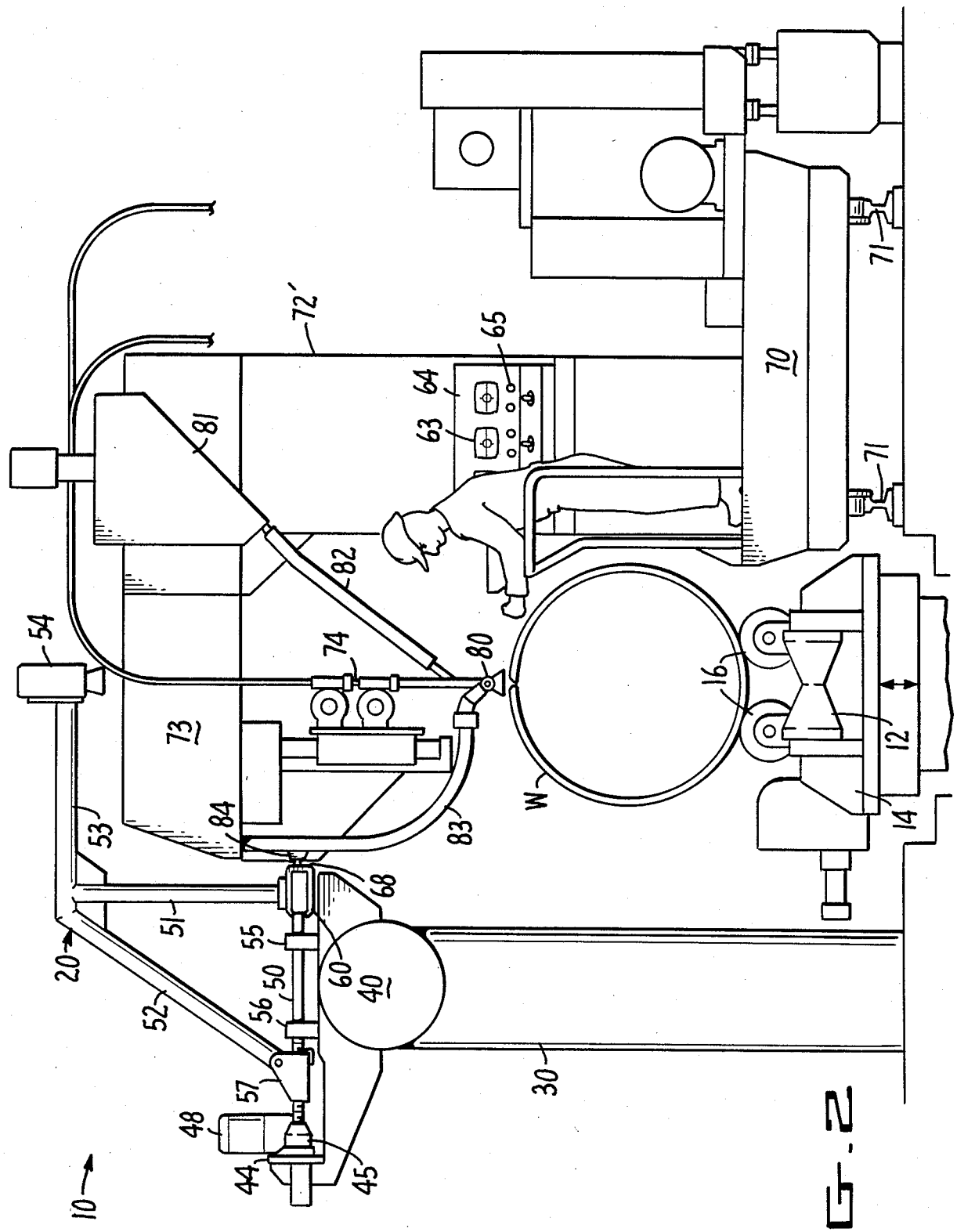
FIG. 2 is an end view in horizontal elevation showing, among other things, the pipe and welding equipment, and complete apparatus, as shown in FIG. 1.

The principal parts of the apparatus of the invention that are utilized in carrying out the method of the invention will be noted by reference to FIGS. 1 and 2. Pipe W is delivered to the machine 10 and is supported on "hour-glass" rolls 12 mounted on supports 14, at a plurality of spaced points along the length of machine 10. The pipe is initially received from conventional conveyor equipment. Vertically adjustable supports 14 are each elevated by column 15 which may hydraulically be actuated by conventional means. Rolls 16 transverse to rolls 12 are provided at opposite ends of the machine for raising and lowering pipe W and to properly position it for welding. The axes of rolls 16 being in the same plane as pipe W are also used to adjust the weld seam location by rotation if the weld seam is not squarely in the 12 o'clock position.

In addition to the above-described hour-glass delivery rolls 12 and elevating rolls 16, the principal parts of a typical outside welding machine and weld seam guide system 10 comprise stationary vertical support columns 30 at each end of the machine, horizontal cross-beam 40 supported on vertical columns 30, the adjustable scanning and tracking assemblies 20 mounted on horizontal cross beam 40, and the welding unit 77 with the accompanying moving platform or cart 70.

Figure 3:
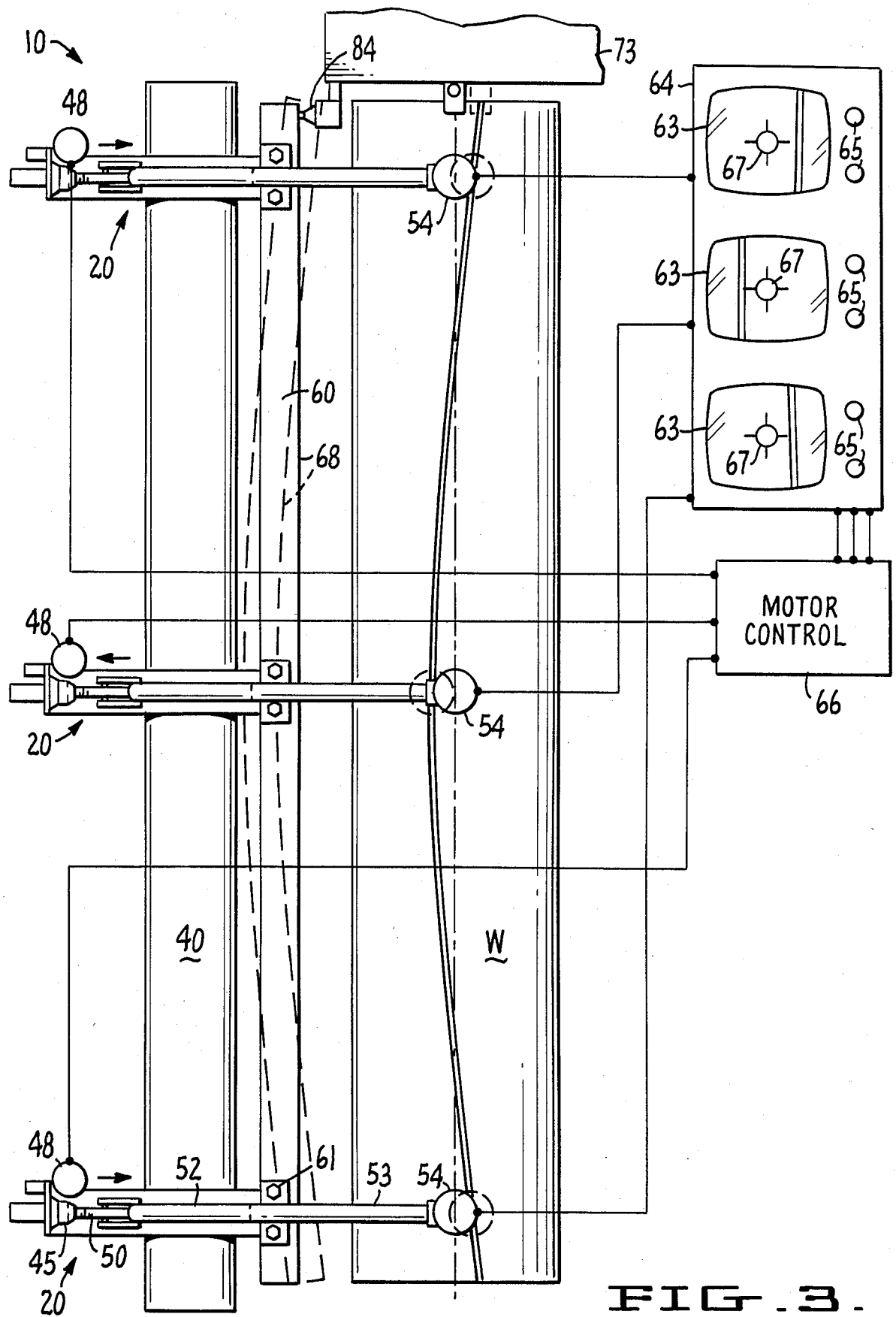
FIG. 3 is a top plan view showing a pipe section to be welded having a typical curved seam pattern requiring alignment of the weld and showing diagrammtically the T.V. equipment for detecting the weld points and the means for adjusting the cameras and tracking beam to effect the proper welding locations.
Figure 4:
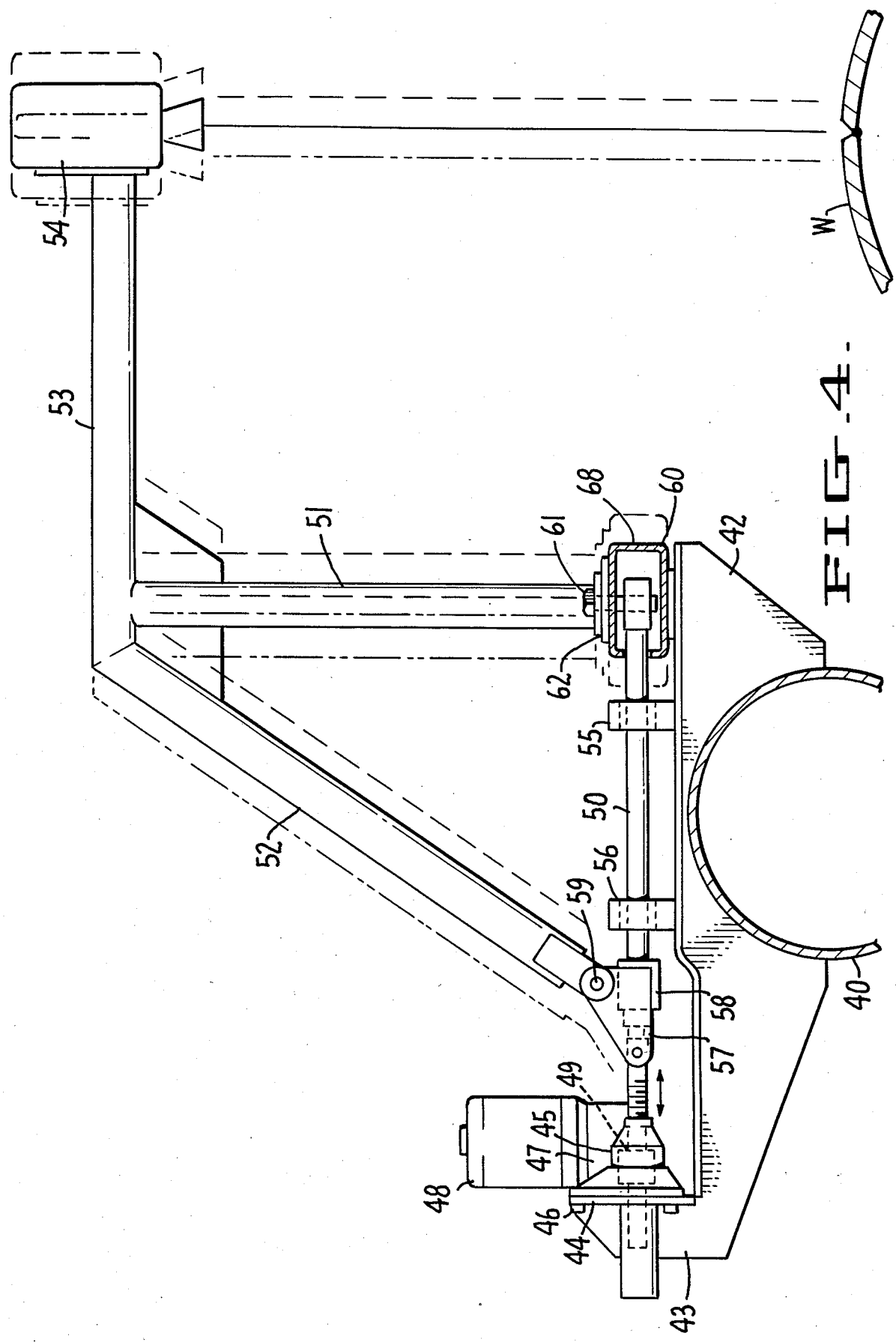
FIG. 4 is a partially broken away horizontal section of one arrangement for a horizontal tracking beam and one of the adjustable means for positioning the guide beam.

Each scanning and tracking beam assembly 20 is of similar construction and design and comprise adjustable optical scanning units which are spaced at measured distances along the length of the horizontal cross beam 40 (see FIG. 1 and FIG. 3). These individual seam tracker assemblies 20 can best be understood by reference to FIG. 4 which is a detailed view of a single unit. Each assembly is mounted on a pair of supporting gussets 42 and 43 securely fastened to horizontal cross beam 40. Cross beam 40 and columns 30 are one means of a construction and design which enables tracking assemblies 20 to be rigidly supported without vibration and maintained in accurate position and alignment.

Gusset 43 which supports the part of the assembly away from the pipe W includes an upstanding flange or plate 44 at the end thereof. Gear housing 45 forming part of a worm gear arrangement is attached to plate 44 by bolts 46. The worm gear bore has threads that mesh with threads on Jack Screw Shaft 50A. Supporting bracket plate 47 is also attached to plate 44 and serves as the mounting for electric motor 48. Worm gear 49 is arranged to mesh with shaft 50.

The remaining components of tube assembly 20 mounted on gussets 42 and 43 comprise vertical tube 51 extending from the end of shaft 50 opposite flange 44, diagonally disposed shaft 52 extending from adjacent worm gear assembly 49 and Jack Screw 50A, and horizontal upper tube 53 which is supported at one of its ends by both tubes 51 and 52. At the opposite end of horizontal tube 53, which extends in cantilever fashion, is scanning camera 54. In the embodiment disclosed herein the optical scanning means is a conventional TV camera.

The assembly comprising shaft 50 and tubes 51, 52 and 53, is adjustably mounted and engages shaft or worm gear Jack Screw arrangement 50A (see FIG. 4) which in turn is connected with and actuated by electric motor 48. Shaft 50, Jack Screw 50A and worm gear 49 are horizontally mounted and supported at intermediate points by journalled brackets 55 and 56 affixed to gussets 42 and 43.

Triangular shaped articulated link 57 is connected to that portion of shaft 50 which is meshed with motor 48 and which is actuated by the worm drive 49. Link 57 which is attached to sleeve 58 in engagement with shaft 50 also has a pin connection or pivot 59 which is attached to diagonal tube 52. Vertical Tube 51 is connected to opposite end of shaft 50 by bolt 61 and washer plates 62. By such arrangement bolts 61, plates 62 and tube 51 are affixed to flexible girder or beam 60.

Flexible girder or beam 60 is adjustable in response to readings by the TV cameras 54 of the scanning assembly showing variations in the position of the seam of the pipe to which the outside weld is to be applied. The T.V. screens 63 on console 64 mounted on traveling cart 90 (FIG. 1 and FIG. 2) for each scanning assembly station show the location of the seam of pipe W as scanned by the camera 54 located immediately above. When the weld seam image on screen 63 shows a variation from the cursor target 67 the scanning assembly is adjusted so that the cursor lines coincide with the pipe seam at that location. This is accomplished through control buttons 65 mounted on panel 64 which are used to energize motor control 66 and actuate the respective motors 48 for movement of the scanning assembly, including the camera position, to align the hairline centering means (cursor) in the T.V. screen with the seam of pipe W. Such adjustment of the scanning assembly is in a horizontal plane so that the resulting movement of shaft 50 moves flexible girder 60. Girder 60 is of generally rectangular cross-section with sufficient stiffness and advantageously has a flat side wall facing in the direction of welding unit 77. As will be apparent, sidewall 68 which provides an even path along its length is an important feature of girder 60.

Figure 7:
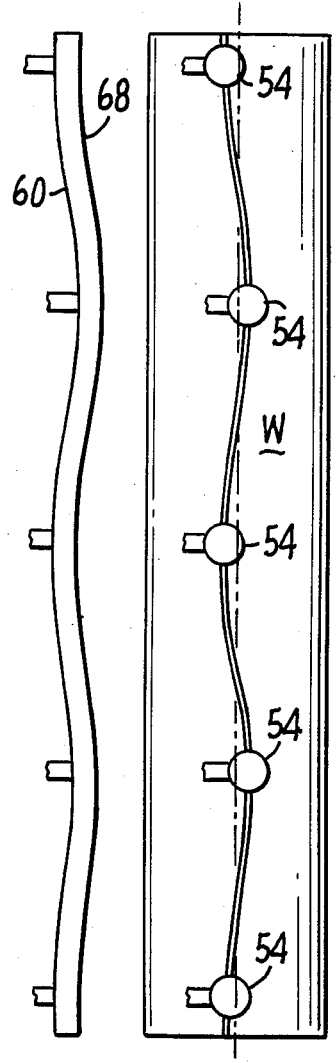

Each of adjustable scanning assemblies 20 on which the camera 54 is mounted are of the same construction and design at each of the stations or points where such equipment is used on the machine. Accordingly, any number of such units may be employed depending on the contour of the particular weld seam to be tracked. Typically for a bowed seam (as shown in FIG. 3) three stations will suffice while for an S-shaped seam (as shown in FIG. 7) five stations are used.

One important feature of the present invention is that the pipe W to which the outside weld is to be applied remains stationary during the welding operation and the welding unit travels along the length of the pipe as the welding operation is carried out. Accordingly, travelling cart or platform 70 on which the welding unit 77 is mounted, travels on steel rails 71. Cart 70 is of a size and weight that it will support without risk of misalignment from vibration or other usage the welding unit 77 which also extends in cantilever fashion from adjustable horizontal beam 73 and vertical support column 72'. Although the welding unit 77 can be of any conventional type of welding head, an advantageous type is shown in the accompanying drawings which is a three-wire AC welding head 80 (see FIG. 5). The horizontally adjustable welding head includes wire feed means 74 receiving power through copper bus bars 75 to electrodes 72 that are mounted immediately above the pipe W and the seam to be welded. Bus bars 75 are firmly bolted in place by insulated horizontal clamps 76 and 76' affixed by supports 79 to overhanging welding head rigid plate support 78 extending down from the movable overhead slide attached to rigid cantilever beam 73. A supply of welding flux is maintained overhead in hopper 81 and is fed to the weld through tube 82 as required. Vacuum means 83 are also available to remove the excess fluxing powder from the solidifying weld.

Figure 5:
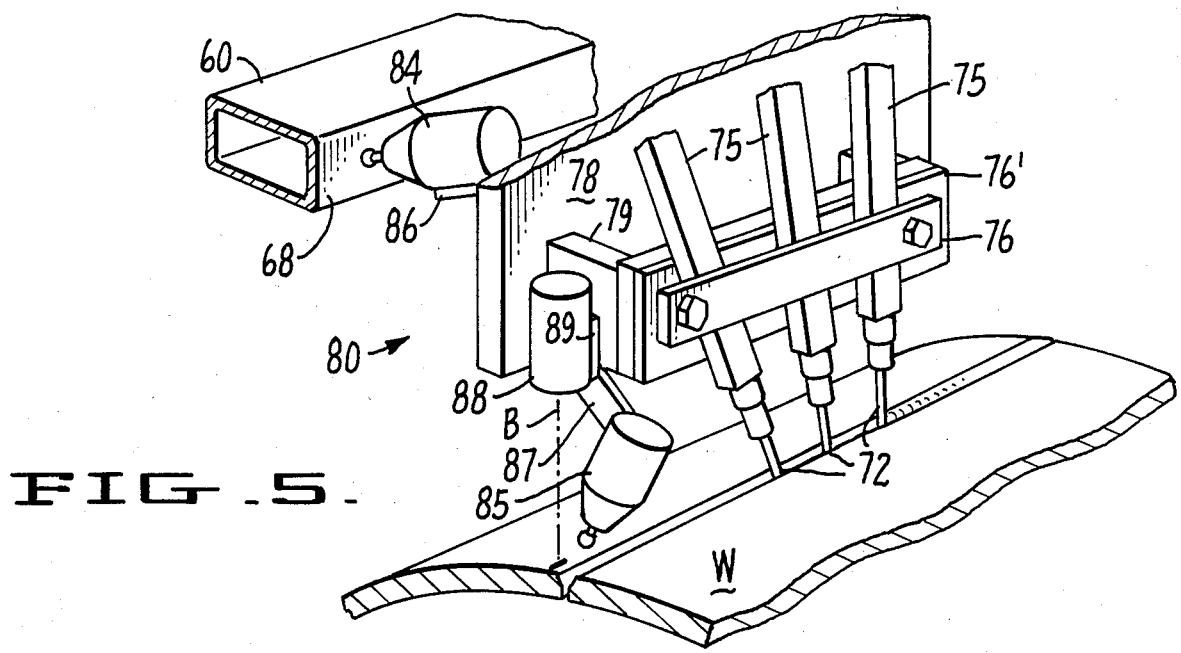
FIG. 5 is a broken away view in perspective of a three-wire weld arrangement useful for applying the weld to a seam of the type to be welded in carrying out the invention.
Figure 6:
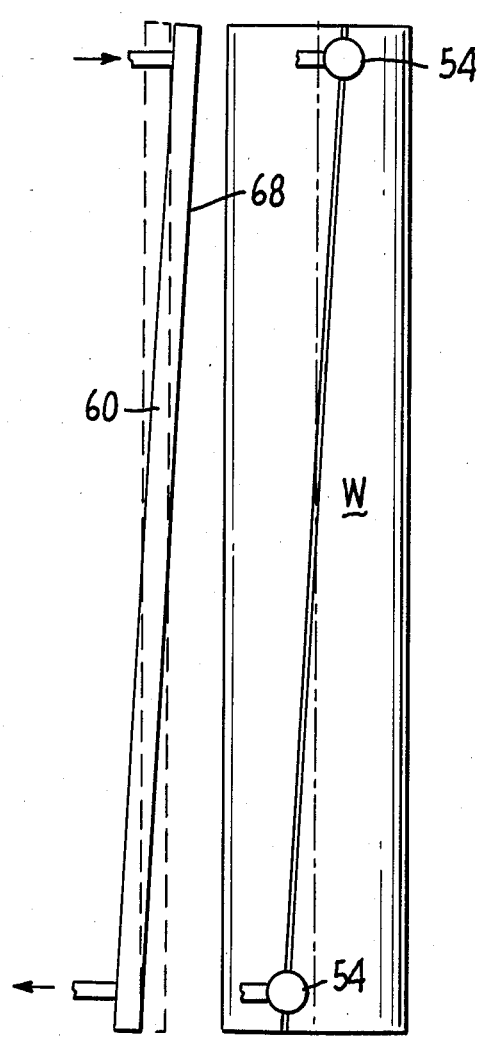
FIG. 6 and FIG. 7 are diagrammatic top plan views of different weld seam patterns which may be traversed according to the invention.

Electronic probes 84 and 85 are each mounted on welding unit 77 a shown in FIG. 5. Probe 84 is horizontally disposed and rigidly supported on flange 86 which is permanently affixed to overhanging plate 78 while probe 85 is generally vertically disposed and similarly supported by arm 87 extending from the leading face of the bus bar support 79 mounted on overhanging plate 78. Probe 84 is in contact with sidewall 68 of flexible girder 60 and probe 85 is in contact with pipe W. Each of electronic probes 84 and 85 are set so that spring actuated nose pieces are at zero positions when the welding electrodes 72 of unit 77 are properly positioned with respect to pipe W and the seam to be welded and therefore no electric signal is given to change the position of the head. As the contour distance from the welding head to the girder 60 changes the probe remains in contact with girder 60 and transmits a signal that actuates a motor to correct the horizontal position of the welding head from the girder returning it the zero position. In like manner, if the surface of pipe W is uneven and the reading for vertical probe 85 is altered, it actuates a motor which adjusts and corrects the vertical position of the welder and returns the probe to a zero position.

A manual adjustment device for the welding unit is provided by light source 88 mounted on bracket 89 fastened to bus bar support plate 78 ahead of the welding electrodes 72. In the event of failure of the electronic probes, and particularly the horizontal probe 84, a manual adjustment of the electrode position can be made by focusing the beam B from light 88 on the weld seam.

In operation the pipe W to be welded is delivered longitudinally from the inside seam welder into machine 10 and is then adjusted to the proper position for welding by the rollers 12 and 16.

The cameras 54 are then brought into position as will be noted from the dotted lines of FIG. 3. The cameras are normally at a point which would correspond to the true longitudinal axis of the pipe section. As will be seen from FIG. 3 which depicts a form of longitudinal bow that frequently is found in relatively long lengths of large diameter thick gauge steel pipe, deviations can be observed by viewing the images which appear on the target viewer display on the console. The operator may then adjust the position of the welder head by moving the flexible beam which moves the camera so that it is immediately above the pipe seam by pressing the buttons on the console so that the target and the seam appear in registry in the viewer. The weld seam image on each viewer move right or left as is required by lining up the camera with the weld seam and with the target. At the same time the flexible beam 60 is moved so that the horizontal distance from the flexible beam to the weld seam is exactly the same throughout the length of the pipe.

Thereafter, when the welding machine is activated the horizontal probe 85, in contact with wall 68 of the flexible beam 60, controls the path of the seam welder as it moves longitudinally along the length of the workpiece W and assures that the welder follows the exact curvature of the weld seam. Vertical probe 86 controls the height of the welder and activates any vertical adjustment thereof that may be required.

It is to be understood that modifications can be made in the above-described invention within the scope of the appended claims.

We claim:

1. A method for automatically tracking an inside weld seam of a large diameter thick guage steel pipe in order to apply an outside weld seam thereto in precise alignment with said weld seam which comprises, optically scanning said weld seam at intermediate stations along the length of said pipe section, adjusting the position of said optical scanning means for precise positioning with respect to the center of said intermediate weld seam as scanned at a particular point by adjusting the position of the support for said optical scanner and thereby moving a flexible girder guide means attached to said support and extending generally parallel to said pipe section to thereby deflect said beam sufficiently to enable said guide means to assume a contour corresponding to the contour of said weld seam, and thereafter applying the outside weld over said weld seam by causing a welding machine to traverse the length of said pipe section by using said flexible box beam as a guide for said outside weld seam path.

2. Apparatus for accurately aligning and applying the outside longitudinal weld seams with the weld seam and the corresponding inside weld of a section of large diameter thick gauge steel pipe comprising, means for maintaining said pipe section in a stationary position, a plurality of adjustable scanning and tracking assemblies mounted on rigid fixed supports at measured stations along the length of said apparatus and extending parallel thereto, each of said adjustable scanning and tracking assemblies, including, (i) optical-scanning means mounted on a frame member above said pipe section at each of said stations for scanning an area of said weld seam immediately therebelow, and (ii) means for adjusting the horizontal position of each said assembly as required to assure that said optical scanning means at each said station is positioned immediately above the center of said weld seam, and guide means connected to each of said assemblies and extending the length of said apparatus and parallel to said pipe section comprising a spring steel girder which is adapted to move in response to adjustment of the horizontal position of said scanning assembly to thereby enable the longitudinal contour thereof to correspond to the longitudinal contour of said inside seam weld.

3. The apparatus of claim 2 including welding means mounted for movement along the length of said apparatus and parallel to said stationary pipe section having probe means mounted thereon for maintaining constant distance contact with said steel girder guide means whereby said welding means follows a path in the application of said outside weld seam that is in complete alignment with said inside longitudinal weld seam.

4. The apparatus of claim 2 wherein the optical scanning means comprises television cameras.

5. The apparatus of claim 2 comprising means for transmitting a signal in response to the reading of said optical scanning means, said signal being adapted to energize motor means mounted in engagement with a horizontally disposed shaft comprising part of said adjustable scanning assembly and adapted for horizontal backward and forward movement to hereby enable said adjustable scanning assembly to assume a position wherein optical scanning means is in exact registry with the inside weld of said pipe section located immediately therebelow.

6. The apparatus of claim 2 comprising means for adjusting the vertical position of said pipe section until said inside weld seams is in registry with the welding head of said welding machine and probe means for maintaining a constant vertical position for said head during the path of travel along the length of said pipe section while carrying out said welding operation.

7. The apparatus of claim 2 wherein said adjustable scanning assembly comprises a lower horizontal tubular beam having a motor mounted at one end thereof for movement of said assembly in a horizontal plane, a vertical tubular means extending from the opposite end of said lower horizontal tube, a diagonally adjustable tube fastened at a point on said lower horizontal tube adjacent said motor and extending to an upper horizontal tube at a point adjacent the end of said upper horizontal tube and to which said vertical tube is fastened, and said upper horizontal tube having optical scanning means mounted thereon to thereby serve as a cantilevered support therefor to enable overhead viewing of said weld seam and horizontal positioning of said assembly, in response to movement of said lower horizontal tubular beam.

8. Apparatus in accordance with claim 2 wherein said welding means includes carriage means movable parallel to and along the length of said pipe section and means engaging said girder guide means to position said welding means a constant horizontal distance from said weld seam and a constant vertical distance from said weld seam along the length of said pipe section.

9. Apparatus in accordance with claim 7 wherein each of said lower horizontally tubular beams includes means in engagement with a motor at the outer end of each said horizontal beam for transverse extension and retraction thereof to thereby accurately adjust the position of said girder guide means at their points of support on said assemblies to whereby said girder guide means assumes a longitudinal contour corresponding to that of said inside weld seam.

* * * * *